United States Patent
Morinaga et al.

(10) Patent No.: US 10,724,881 B2
(45) Date of Patent: *Jul. 28, 2020

(54) THERMAL AIR FLOW METER WITH ADJUSTMENT OF PULSATION CORRECTION FUNCTION

(71) Applicant: Mitsubishi Electric Corporation, Tokyo (JP)

(72) Inventors: Naoki Morinaga, Tokyo (JP); Yuji Ariyoshi, Tokyo (JP); Shinichiro Hidaka, Tokyo (JP); Masahiro Kawai, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 274 days.

This patent is subject to a terminal disclaimer.

(21) Appl. No.: 15/647,354

(22) Filed: Jul. 12, 2017

(65) Prior Publication Data
US 2018/0266861 A1 Sep. 20, 2018

(30) Foreign Application Priority Data
Mar. 15, 2017 (JP) ................................ 2017-049340

(51) Int. Cl.
*G01F 1/692* (2006.01)
*F02D 41/18* (2006.01)
(Continued)

(52) U.S. Cl.
CPC ............. *G01F 1/692* (2013.01); *F02D 41/18* (2013.01); *F02D 41/187* (2013.01); *F02D 41/24* (2013.01);
(Continued)

(58) Field of Classification Search
CPC ... G01F 1/692; G01F 1/69; G01F 1/72; G01F 5/00; G01F 1/698; G01F 1/6842;
(Continued)

(56) References Cited

U.S. PATENT DOCUMENTS 10,006,792 B2 * 6/2018 Morinaga ............... G01F 1/692
2014/0224004 A1 * 8/2014 Ariyoshi ................... G01F 5/00
73/114.34

FOREIGN PATENT DOCUMENTS

JP 5558599 B1 7/2014

* cited by examiner

*Primary Examiner* — Eric S. McCall
*Assistant Examiner* — Timothy P Graves
(74) *Attorney, Agent, or Firm* — Sughrue Mion, PLLC; Richard C. Turner (57) ABSTRACT

This signal processing unit includes: a comparison signal output unit which outputs a comparison signal on a negative side that corresponds to a negative side portion, of a second amplitude-increased signal, which is on the negative side with respect to the comparison threshold TH; an averaging processing unit which outputs an average signal obtained by averaging the comparison signal; a coefficient multiplication processing unit which outputs a coefficient-multiplied signal obtained by multiplying the average signal by an adjustment coefficient set in advance; and a signal correction processing unit which outputs, as a flow rate signal, a value obtained by correcting a first amplitude-increased signal so as to be decreased by use of the coefficient-multiplied signal, wherein the comparison threshold TH is set on the basis of an output characteristic of a sensor measured in advance with respect to at least a forward flow direction of an intake air.

5 Claims, 7 Drawing Sheets

(51) Int. Cl.
  *G01F 1/69*   (2006.01)
  *F02D 41/26*  (2006.01)
  *F02D 41/28*  (2006.01)
  *G01F 1/698*  (2006.01)
  *G01F 1/72*   (2006.01)
  *G01F 5/00*   (2006.01)
  *F02D 41/24*  (2006.01)
  *F02M 35/10*  (2006.01)
  *G01F 1/684*  (2006.01)

(52) U.S. Cl.
  CPC ............. *F02D 41/26* (2013.01); *F02D 41/28* (2013.01); *F02M 35/10386* (2013.01); *G01F 1/69* (2013.01); *G01F 5/005* (2013.01); *F02D 2041/285* (2013.01); *G01F 1/6842* (2013.01); *G01F 1/698* (2013.01); *G01F 1/72* (2013.01); *G01F 5/00* (2013.01)

(58) Field of Classification Search
  CPC .......... F02D 41/24; F02D 41/26; F02D 41/28; F02D 2041/285; F02D 41/187; F02D 41/18
  See application file for complete search history.

THERMAL AIR FLOW METER WITH ADJUSTMENT OF PULSATION CORRECTION FUNCTION

BACKGROUND OF THE INVENTION

1. Field of the Invention

The present invention relates to a thermal air flow meter which detects the flow rate of intake air in an internal combustion engine.

2. Description of the Background Art

Thermal air flow meters capable of measuring the mass flow rate of intake air have been widely used in electronically-controlled fuel injection systems for internal combustion engines mounted in vehicles or the like.

However, in such a thermal air flow meter, a pulsation flow accompanied with a reverse flow occurs under an operation condition of a low rotation rate and a high load of an internal combustion engine.

Thus, in a conventional thermal air flow meter that cannot detect a reverse flow, a large flow rate detection error occurs.

In order to reduce such a flow rate detection error during measurement of a pulsation flow accompanied with a reverse flow, a method has been proposed in which: an air flow direction is detected; and when a reverse flow has been detected, a flow rate signal is corrected.

For example, in the technology according to Japanese Patent No. 5558599, when a pulsation accompanied with a reverse flow has occurred, a differential amplifier unit 2 takes out a flow rate signal in the reverse flow direction and the flow rate signal is converted into a pulse signal. Then, this pulse signal is smoothed by an LPF unit, and the resultant signal is subtracted from the original flow rate signal, whereby pulsation correction is performed.

However, there is no description of a method for setting a reference voltage that is used when the differential amplifier unit 2 takes out a flow rate signal Vd1 in the reverse flow direction, and variation in other electronic components influences the reference voltage at the time of the flow rate signal in the reverse flow direction being taken out. This causes a problem of increased variation in pulsation characteristics in individual sensors.

SUMMARY OF THE INVENTION

The present invention has been made in order to solve the above-described problem in conventional technologies. An object of the present invention is to provide a thermal air flow meter that can realize accurate flow rate measurement by means of inexpensive configuration, even when a pulsation flow accompanied with a reverse flow has occurred.

The present invention is a thermal air flow meter including: a bypass flow path which is disposed in an intake pipe in which intake air to be taken into an internal combustion engine flows, and which takes in part of the intake air and causes the part of the intake air to flow therethrough; a sensor which has a flow rate detection element disposed in the bypass flow path and which outputs an output signal that corresponds to a flow rate of the intake air flowing in a forward flow direction and a reverse flow direction in the intake pipe; and a signal processing unit which processes the output signal of the sensor, wherein the signal processing unit includes: a response correction unit which outputs a first amplitude-increased signal and a second amplitude-increased signal which are each obtained by subjecting the output signal of the sensor to an amplitude-increasing process of an alternating current component thereof; a comparison signal output unit which compares the second amplitude-increased signal with a comparison threshold set in advance, and which outputs a comparison signal on a negative side that corresponds to a negative side portion, of the second amplitude-increased signal, which is on the negative side with respect to the comparison threshold; an averaging processing unit which outputs an average signal obtained by averaging the comparison signal; a coefficient multiplication processing unit which outputs a coefficient-multiplied signal obtained by multiplying the average signal by an adjustment coefficient set in advance; and a signal correction processing unit which outputs, as a flow rate signal, a value obtained by correcting the first amplitude-increased signal so as to be decreased by use of the coefficient-multiplied signal, and the comparison threshold is set on the basis of an output characteristic of the sensor measured in advance.

According to the present invention, a comparison threshold that could influence pulsation correction can be accurately set in individual sensors. In addition, even when the reverse flow characteristic is not measured, a comparison threshold can be accurately set. Thus, capital investment for measuring the reverse flow characteristic is not required, and man-hour at the time of assembling can be reduced.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

A thermal air flow meter 1 according to the present embodiment is described with reference to the drawings.

The thermal air flow meter 1 is mounted to an intake pipe 35 in which intake air to be taken into an internal combustion engine flows.

Figure 1:
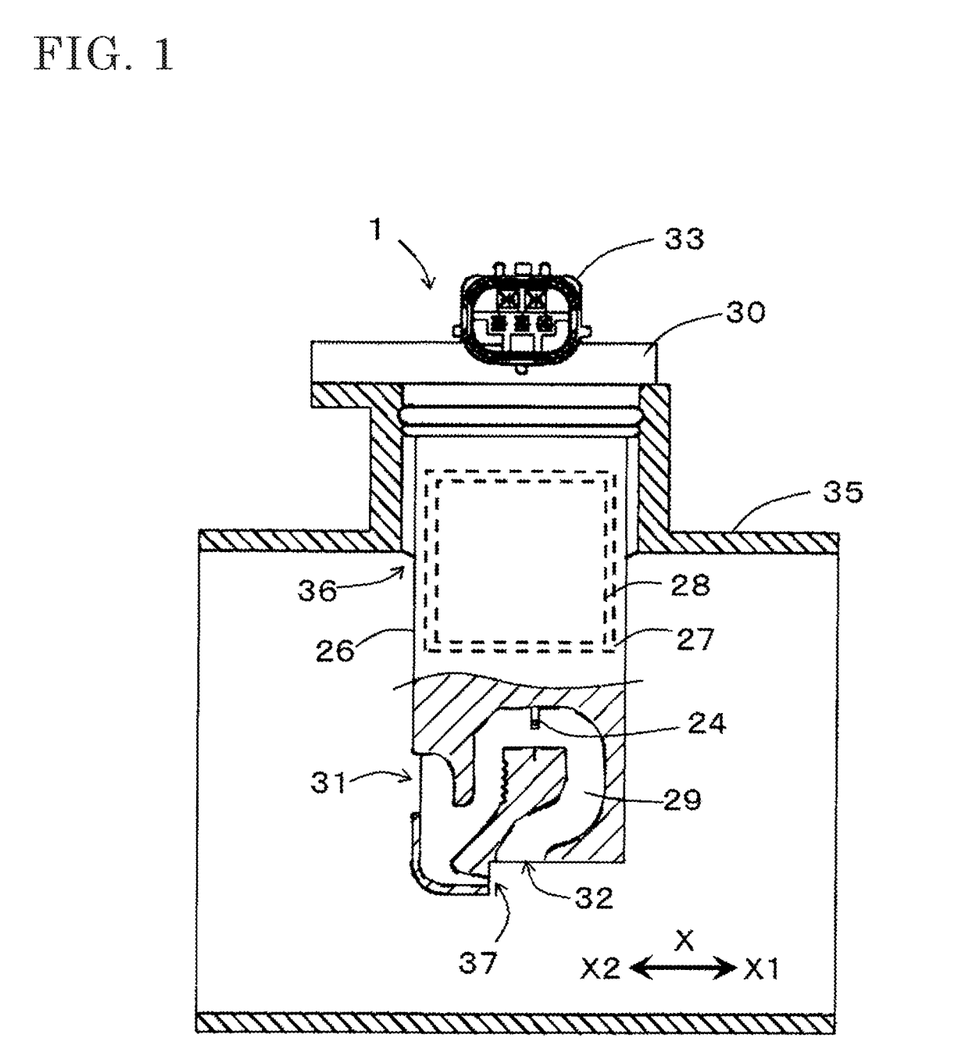
FIG. 1 is a side sectional view of a thermal air flow meter according to a first embodiment of the present invention, cut along a plane parallel to a flow direction X of intake air.

FIG. 1 is a side sectional view of the thermal air flow meter 1 mounted to the intake pipe 35, cut along a plane parallel to a flow direction X of intake air.

In a state where a main unit 26 of the thermal air flow meter 1 is inserted in the intake pipe 35 through an insertion hole 36 provided in the intake pipe 35, a flange portion 30 of the thermal air flow meter 1 is fixed to the intake pipe 35.

The thermal air flow meter 1 includes: a bypass flow path 29 which is disposed in the intake pipe 35 and which takes in part of intake air flowing in the intake pipe 35 and causes the part of the intake air to flow therethrough; a sensor 25 having a flow rate detection element 24 disposed in the bypass flow path 29; and a signal processing unit 3 which processes an output signal Vm of the sensor 25.

In the main unit 26, a connector portion 33, a circuit housing portion 27, and the bypass flow path 29 are formed along the insertion direction of the main unit 26 into the intake pipe 35 of the thermal air flow meter 1.

The circuit housing portion 27 houses a circuit board 28 on which a differential current output circuit 18 of the sensor 25 and a processing circuit of the signal processing unit 3 described later are mounted.

A drive power supply 22 for each circuit and a flow rate signal Vout from the signal processing unit 3 are connected, via the connector portion 33, to an external power supply and an external control device.

<Bypass Flow Path 29>

Intake air in the intake pipe 35 usually flows in a forward flow direction X1 during operation of the internal combustion engine.

The forward flow direction X1 is the direction of flow advancing from the inlet of the intake pipe 35 toward the internal combustion engine.

However, when a throttle valve provided in the intake pipe 35 to the downstream side in the forward flow direction X1 relative to the thermal air flow meter 1 is opened, and the differential pressure between the upstream and the downstream of the throttle valve decreases, a pressure pulsation is transmitted to the thermal air flow meter 1 from the internal combustion engine side.

Due to this pressure pulsation, the flow rate of the intake air flowing in the vicinity of the thermal air flow meter 1 is pulsated.

When the amplitude of the transmitted pressure pulsation increases, a section in which the intake air flows in a reverse flow direction X2 occurs in the pulsation flow.

The reverse flow direction X2 is the direction of flow advancing from the internal combustion engine toward the inlet of the intake pipe 35.

Thus, the intake air in the intake pipe 35 flows not only in the forward flow direction X1 but also in the reverse flow direction X2 under the influence of pulsation.

Meanwhile, the bypass flow path 29 is configured to allow air to pass therethrough in a direction according to the forward flow direction X1 or the reverse flow direction X2 of the intake air in the intake pipe 35.

That is, when the intake air is flowing in the forward flow direction X1 within the intake pipe 35, air flows in the forward flow direction X1 within the bypass flow path 29.

Meanwhile, when the intake air is flowing in the reverse flow direction X2 within the intake pipe 35, air flows in the reverse flow direction X2 within the bypass flow path 29.

In the present embodiment, the bypass flow path 29 includes: a flow-in hole 31 which is open toward the upstream side of the forward flow direction X1; and a flow-out hole 32 which is open toward a direction perpendicular to the flow direction X (in the present example, the insertion direction of the main unit 26).

Part of the intake air flowing in the forward flow direction X1 flows into the flow-in hole 31, flows in the forward flow direction X1 within the bypass flow path 29, passes the flow rate detection element 24, and then, flows through the flow-out hole 32 into the intake pipe 35.

Meanwhile, part of the intake air flowing in the reverse flow direction X2 flows into the flow-out hole 32, flows in the reverse flow direction X2 within the bypass flow path 29, passes the flow rate detection element 24, and then, flows through the flow-in hole 31 into the intake pipe 35.

The flow-out hole 32 is open in the direction perpendicular to the flow direction X. Therefore, under a condition in which the flow rates of the intake air in the forward flow direction X1 and in the reverse flow direction X2 are the same, the flow rate of the intake air in the reverse flow direction X2 flowing into the flow-out hole 32 is less than the flow rate of the intake air in the forward flow direction X1 flowing into the flow-in hole 31.

In the present embodiment, the bypass flow path 29 is provided with a sub flow-out hole 37, but may not be provided with the sub flow-out hole 37.

<Sensor 25>

The sensor 25 has the flow rate detection element 24 disposed in the bypass flow path 29.

Figure 2:
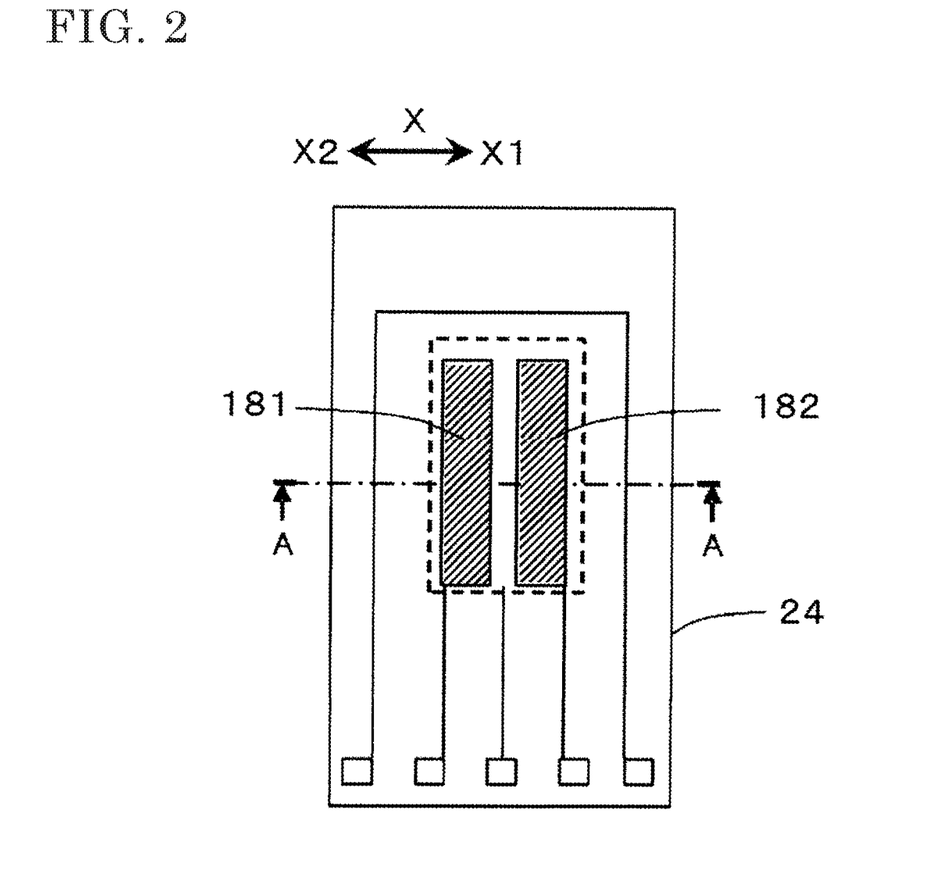
FIG. 2 is a plan view of a flow rate detection element of the thermal air flow meter according to the first embodiment of the present invention.

FIG. 2 is a plan view of the flow rate detection element 24.

Figure 3:
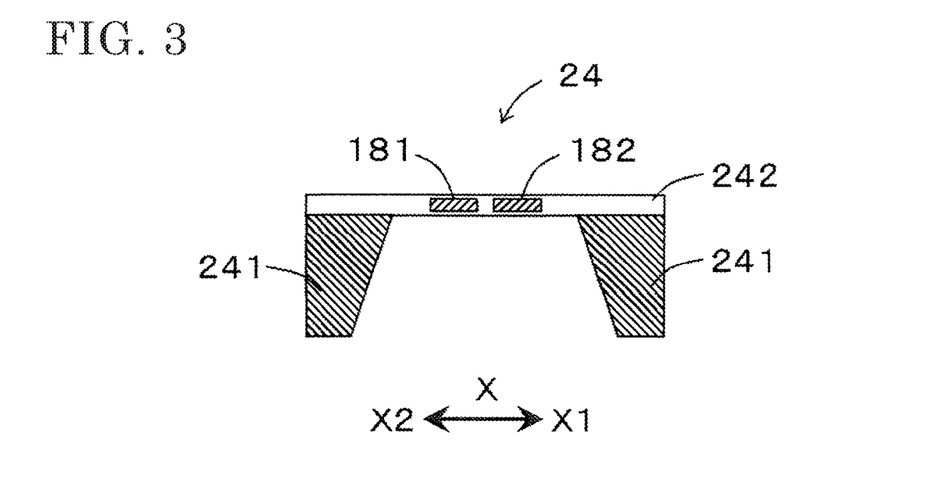
FIG. 3 is a cross-sectional view of the flow rate detection element cut along the A-A line in FIG. 2.

FIG. 3 is a cross-sectional view of the flow rate detection element 24 cut along the A-A line in FIG. 2.

The sensor 25 includes, as the flow rate detection element 24: an upstream heating resistor 181 which is a heating resistor at the upstream side in the forward flow direction X1; and a downstream heating resistor 182 which is a heating resistor disposed to the downstream side in the forward flow direction X1 relative to the upstream heating resistor 181.

When air flows in the forward flow direction X1, the temperature of the upstream heating resistor 181 becomes low relative to that of the downstream heating resistor 182.

When air flows in the reverse flow direction X2, the temperature of the downstream heating resistor 182 becomes low relative to that of the upstream heating resistor 181.

In addition, the relative temperature difference increases in accordance with increase in the flow rate in the forward flow direction X1 or in the reverse flow direction X2.

The resistance value of the heating resistor 181, 182 decreases in accordance with decrease in the temperature thereof.

Although details are described later, by using the resistance difference caused by the relative temperature difference, the flow direction and the magnitude of the flow rate can be detected.

The flow rate detection element 24 is composed of a silicon substrate 241 and an insulation film 242 formed on a surface thereof. The upstream heating resistor 181 and the downstream heating resistor 182 are formed in the insulation film 242.

The silicon substrate 241 on the back surface side of the portion of the insulation film 242 where the heating resistors 181 and 182 are formed has been removed through etching or the like. As a result, the portion where the heating resistors 181 and 182 are formed is in the form of a thin film.

Figure 4:
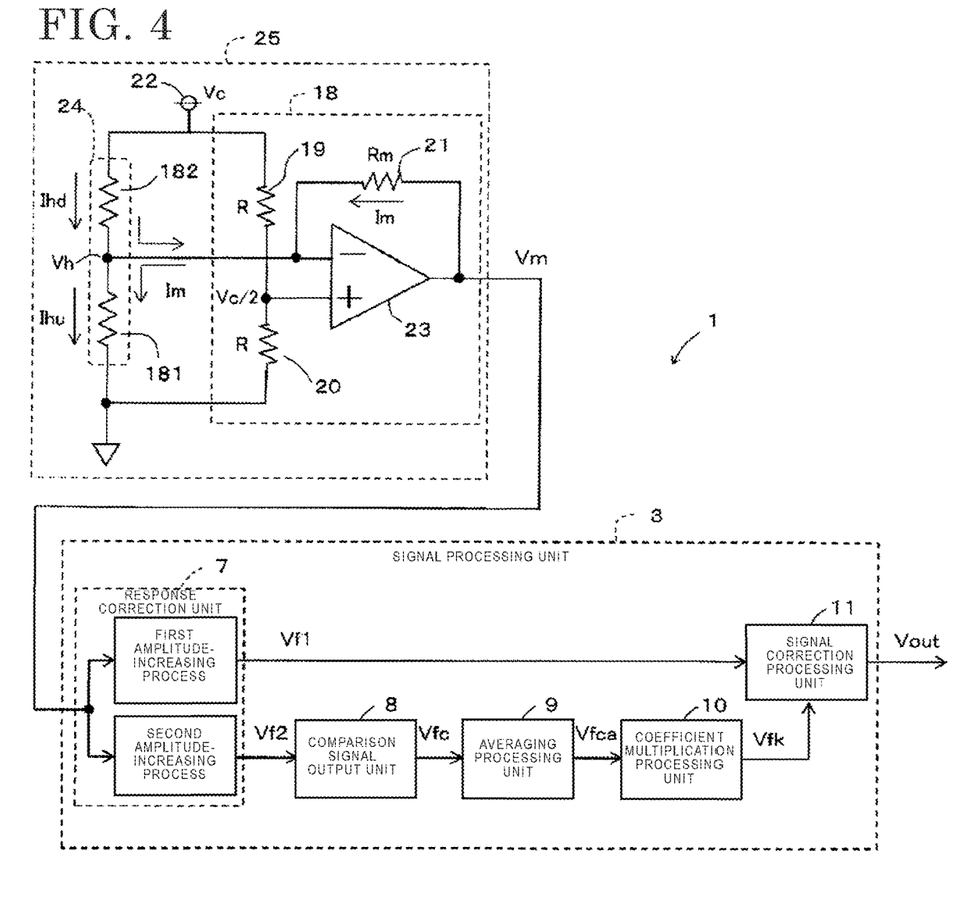
FIG. 4 is a circuit diagram of a sensor and a block diagram of a signal processing unit of the thermal air flow meter according to the first embodiment of the present invention.

FIG. 4 is a circuit diagram of the sensor 25 and a block diagram of the signal processing unit 3.

The sensor 25 includes the differential current output circuit 18. The differential current output circuit 18 generates the output signal Vm which corresponds to the difference between: an upstream current Ihu which flows in the upstream heating resistor 181 in order to keep the voltage across both ends of the upstream heating resistor 181 at an upstream voltage value set in advance; and a downstream current Ihd which flows in the downstream heating resistor 182 in order to keep the voltage across both ends of the downstream heating resistor 182 at a downstream voltage value set in advance.

In the present embodiment, the differential current output circuit 18 includes an upstream fixed resistance 20, a downstream fixed resistance 19, an operational amplifier 23, and an output resistance 21.

The output terminal of the operational amplifier 23 and the negative-side input terminal of the operational amplifier 23 are connected to each other via the output resistance 21.

This connection forms a negative feedback circuit in which when a potential difference has occurred between the negative-side input terminal and the positive-side input terminal of the operational amplifier 23, current flows in the output resistance 21 so as to eliminate the potential difference.

The downstream fixed resistance 19 and the upstream fixed resistance 20 are connected in series in this order, between the power supply 22 and the ground.

The connection portion between the downstream fixed resistance 19 and the upstream fixed resistance 20 is connected to the positive-side input terminal of the operational amplifier 23.

Thus, a voltage obtained by a power supply voltage Vc being divided between the downstream fixed resistance 19 and the upstream fixed resistance 20 is inputted to the positive-side input terminal of the operational amplifier 23.

The voltage across both ends of the upstream fixed resistance 20, which is a divided power supply voltage Vc, corresponds to the upstream voltage value. The voltage across both ends of the downstream fixed resistance 19, which is the other divided power supply voltage Vc, corresponds to the downstream voltage value.

In the present embodiment, the upstream fixed resistance 20 and the downstream fixed resistance 19 have the same resistance value R, the upstream voltage value and the downstream voltage value are each ½ of the power supply voltage Vc, and ½ of the power supply voltage Vc is inputted to the positive-side input terminal of the operational amplifier 23.

The downstream heating resistor 182 and the upstream heating resistor 181 are connected in series in this order, between the power supply 22 and the ground.

The connection portion between the downstream heating resistor 182 and the upstream heating resistor 181 is connected to the negative-side input terminal of the operational amplifier 23.

Thus, a voltage Vh obtained by the power supply voltage Vc being divided between the downstream heating resistor 182 and the upstream heating resistor 181 is inputted to the negative-side input terminal of the operational amplifier 23.

In the present embodiment, the downstream heating resistor 182 and the upstream heating resistor 181 have the same resistance value if the temperatures thereof are the same.

In a case where the flow is in the forward flow direction X1, the temperature of the upstream heating resistor 181 is lowered relative to that of the downstream heating resistor 182. Thus, the resistance value of the upstream heating resistor 181 is lowered relative to that of the downstream heating resistor 182.

As a result, the voltage Vh at the negative-side input terminal of the operational amplifier 23 becomes lower than the voltage (Vc/2) at the positive-side input terminal of the operational amplifier 23.

Accordingly, the voltage Vm at the output terminal of the operational amplifier 23 becomes higher than the voltage Vh at the negative-side input terminal thereof, and a current Im flows in the output resistance 21 from the output terminal side toward the negative-side input terminal side.

The upstream current Ihu flowing in the upstream heating resistor 181 becomes larger than the downstream current Ihd flowing in the downstream heating resistor 182.

The current Im flowing in the output resistance 21 is expressed as Expression (1).

In accordance with increase in the flow rate in the forward flow direction X1, the relative amount of decrease in temperature and the relative amount of decrease in resistance of the upstream heating resistor 181 increase. Thus, the current Im increases.

$Ihu > Ihd$ $$Im = Ihu - Ihd > 0 \quad (1)$$

Meanwhile, in a case where the flow is in the reverse flow direction X2, the temperature of the downstream heating resistor 182 is lowered relative to that of the upstream heating resistor 181. Thus, the resistance value of the downstream heating resistor 182 is lowered relative to that of the upstream heating resistor 181.

As a result, the voltage Vh at the negative-side input terminal of the operational amplifier 23 becomes higher than the voltage (Vc/2) at the positive-side input terminal of the operational amplifier 23.

Accordingly, the voltage Vm at the output terminal of the operational amplifier 23 becomes lower than the voltage Vh at the negative-side input terminal thereof, and the current Im flows in the output resistance 21 from the negative-side input terminal side toward the output terminal side.

The downstream current Ihd flowing in the downstream heating resistor 182 becomes larger than the upstream current Ihu flowing in the upstream heating resistor 181.

The current Im is expressed as Expression (2).

In accordance with increase in the flow rate in the reverse flow direction X2, the relative amount of decrease in temperature and the relative amount of decrease in resistance of the downstream heating resistor 182 increase. Thus, the current Im decreases.

$Ihu < Ihd$ $$Im = Ihu - Ihd < 0 \quad (2)$$

The voltage Vm at the output terminal of the operational amplifier 23, that is, the output signal Vm of the sensor 25 is expressed as Expression (3).

Here, Rm is the resistance value of the output resistance 21.

Figure 5:
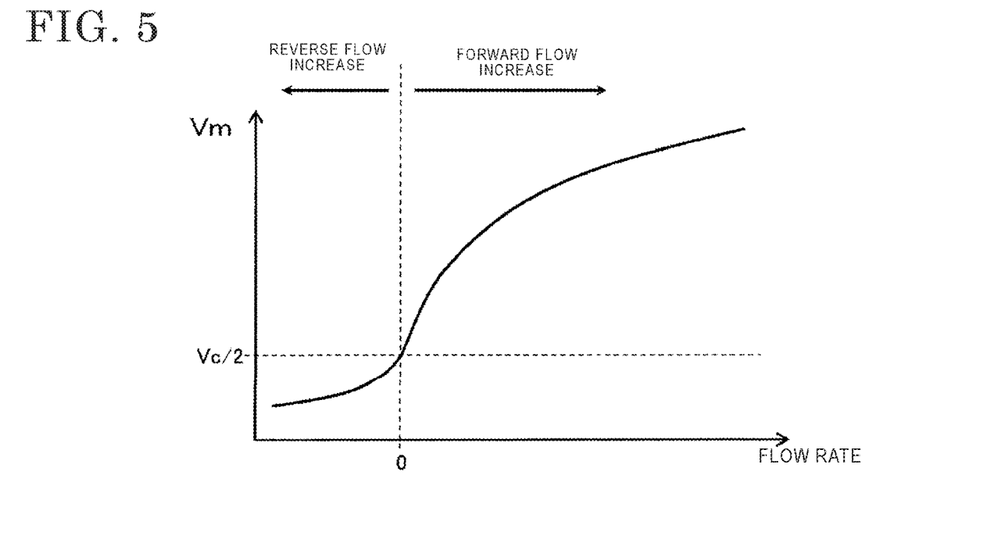
FIG. 5 shows an output characteristic of the sensor according to the first embodiment of the present invention.

Thus, as shown in FIG. 5, the output signal Vm of the sensor 25 exhibits a characteristic in which the output signal Vm monotonically increases in accordance with increase in the flow rate, both in the forward flow and the reverse flow.

$$Vm = Vc/2 + Rm \times Im \quad (3)$$

FIG. 5 shows the output characteristic of the sensor 25 according to the present embodiment.

The flow rate in the forward flow direction X1 is expressed by positive values, and the flow rate in the reverse flow direction X2 is expressed by negative values.

That is, in accordance with increase in the magnitude of the flow rate in the forward flow direction X1, the flow rate increases from 0 (zero), and in accordance with increase in the magnitude of the flow rate in the reverse flow direction X2, the flow rate decreases from 0.

The output characteristic of the sensor 25 is a nonlinear monotonically increasing characteristic.

In addition, the output characteristic of the sensor 25 is different between the forward flow direction X1 side where the flow rate is greater than 0 and the reverse flow direction X2 side where the flow rate is smaller than 0.

Specifically, on the forward flow direction X1 side, the output characteristic of the sensor 25 is: as the flow rate increases from 0, the slope of the increase in the output signal Vm against the increase in the flow rate decreases, accordingly.

On the reverse flow direction X2 side, the output characteristic of the sensor 25 is: as the flow rate decreases from 0, the slope of the decrease in the output signal Vm against the decrease in the flow rate decreases, accordingly.

In addition, due to the difference and the like in the directions in which the flow-in hole 31 and the flow-out hole 32 of the bypass flow path 29 are open, if the magnitude of the flow rate of the intake air in the forward flow direction X1 and the magnitude of the flow rate of the intake air in the reverse flow direction X2 are the same, the output sensitivity to the flow rate in the reverse flow direction X2 is lower than that in the forward flow direction X1.

That is, the slope of the output signal Vm against the flow rate in the reverse flow direction X2 is smaller than that in the forward flow direction X1.

When the temperature of the heating resistor 181, 182 changes in response to change in the flow rate, there is response delay due to the heat capacity or the like of the heating resistor.

Thus, there is response delay in the output signal Vm of the sensor 25, relative to the true flow rate.

When a pulsation flow has occurred, an amplitude of the pulsation flow that corresponds to the output signal Vm of the sensor 25 is decreased relative to the true amplitude of the pulsation flow.

<Signal Processing Unit 3>

The signal processing unit 3 processes the output signal Vm of the sensor 25, and outputs the flow rate signal Vout. As shown in FIG. 4, the signal processing unit 3 includes a response correction unit 7, a comparison signal output unit 8, an averaging processing unit 9, a coefficient multiplication processing unit 10, and a signal correction processing unit 11.

Each processing unit 7 to 11 of the signal processing unit 3 is realized by a processing circuit.

In the present embodiment, the signal processing unit 3 is composed of a digital processing circuit.

Specifically, the signal processing unit 3 includes: an arithmetic processing unit such as a DSP (digital signal processor); a storage device which communicates data with the arithmetic processing unit; an A/D converter (analog-digital converter) which inputs the output signal Vm of the sensor 25 to the arithmetic processing unit; a D/A converter (digital-analog converter) which outputs to the outside the flow rate signal Vout processed by the arithmetic processing unit; and the like.

Each function of the processing unit 7 to 11 of the signal processing unit 3 is realized by the arithmetic processing unit executing programs stored in the storage device and by the arithmetic processing unit cooperating with the storage device, the A/D converter, the D/A converter, and the like.

The data of settings such as a comparison threshold TH used by each processing unit 7 to 11 or the like is stored in the storage device, as a part of a program.

The mechanism of how a flow rate detection error occurs when a pulsation flow accompanied with a reverse flow has occurred is described.

Figure 6:
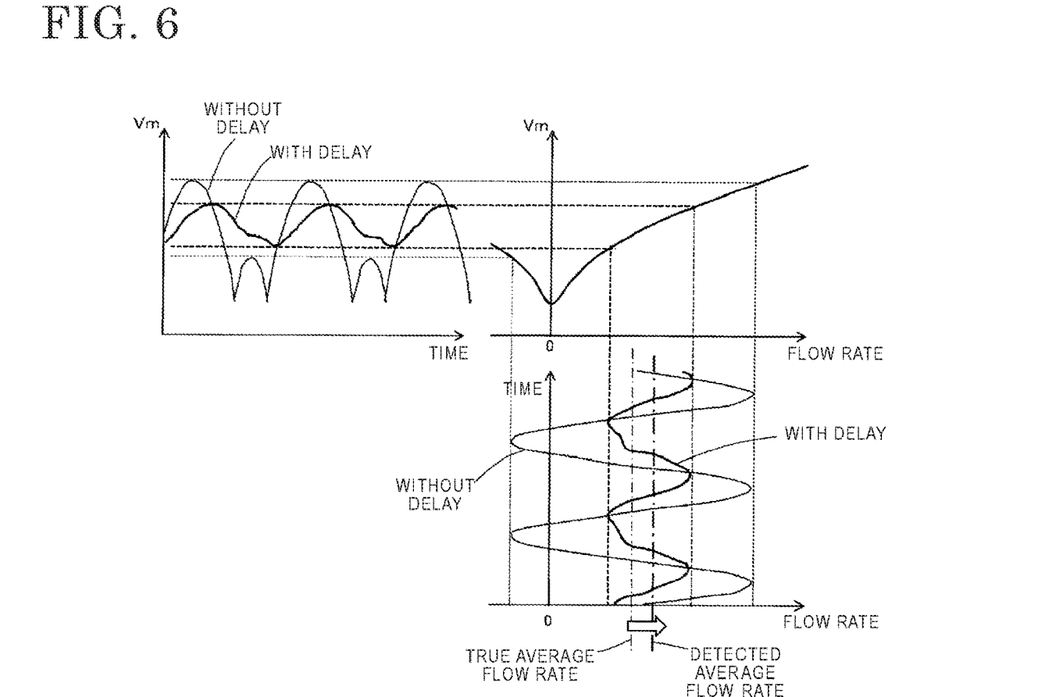
FIG. 6 is an operation waveform chart describing a mechanism of how a flow rate detection error occurs when a pulsation flow accompanied with a reverse flow has occurred.

In a case of a sensor that cannot detect a reverse flow according to a comparison example, which is different from the present embodiment, as shown in the upper right graph in FIG. 6, in a reverse flow occurrence region, the output signal of the sensor is higher than the output at a time of no air flow. Thus, if the output signal of the sensor is directly converted into a flow rate, the waveform will have a shape in which the portion of the waveform at the time of occurrence of a reverse flow is folded to the forward flow side.

The detected average flow rate of 1 cycle of pulsation, which is important for control of the internal combustion engine, becomes larger than the true average flow rate, and thus, a detection error (hereinafter, referred to as pulsation error) occurs.

Figure 7:
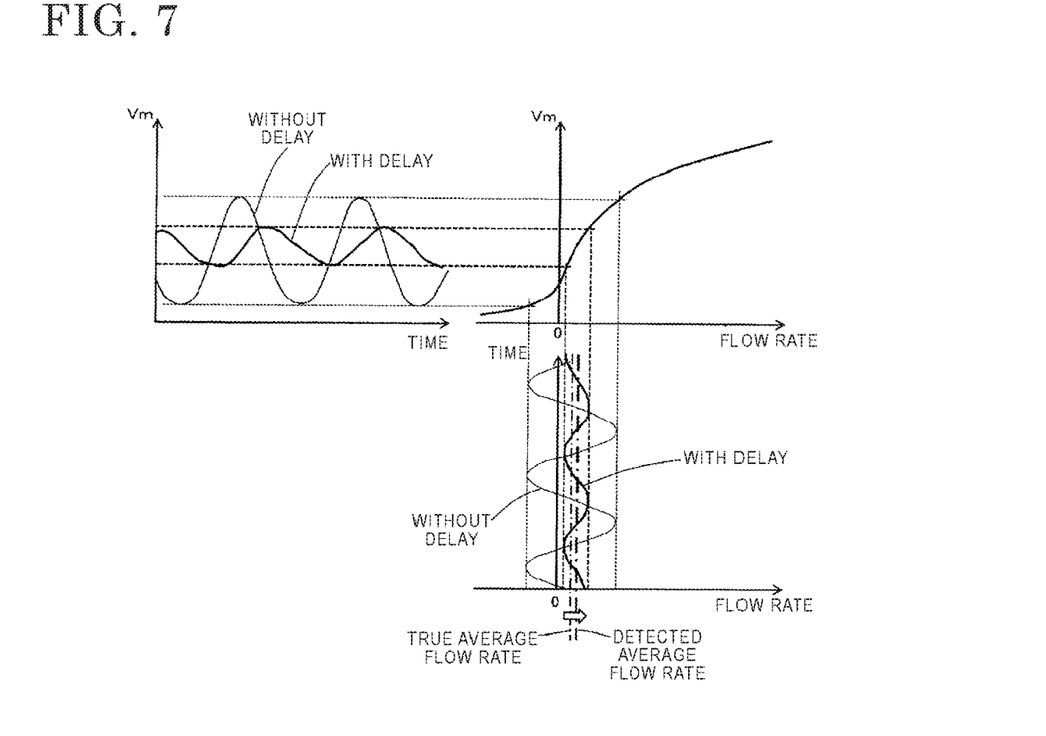
FIG. 7 is an operation waveform chart describing a comparison example where processing different from that in the first embodiment of the present invention is performed.

In a case of a comparison example where processing different from that in the present embodiment is performed, even when the sensor 25 capable of detecting a reverse flow as in the present embodiment is used, a pulsation error occurs, as shown in FIG. 7, in which the detected average flow rate detected on the basis of the output signal Vm of the sensor 25 is shifted to the positive side with respect to the true average flow rate, due to the nonlinear output characteristic of the sensor 25 and the response delay of the output signal Vm described above.

The reason for this is as follows. As described above, in the reverse flow occurrence region, in accordance with increase in the magnitude of the reverse flow rate, the slope of the output signal Vm against the flow rate decreases, and thus, the sensitivity of the output signal Vm to the increase in the magnitude of the reverse flow rate is reduced.

In addition, due to the difference in the directions in which the flow-in hole 31 and the flow-out hole 32 of the bypass flow path 29 are open, the sensitivity of the output signal Vm to the reverse flow rate is made lower.

Thus, when assuming that there is no response delay, the sensitivity of the output signal Vm to the increase in the magnitude of the reverse flow rate is reduced, and when there is response delay, the output signal Vm is shifted to the forward flow rate side (positive side) where the sensitivity is high.

Thus, the detected average flow rate detected on the basis of the output signal Vm having response delay is shifted to the positive side with respect to the true average flow rate.

Figure 8A:
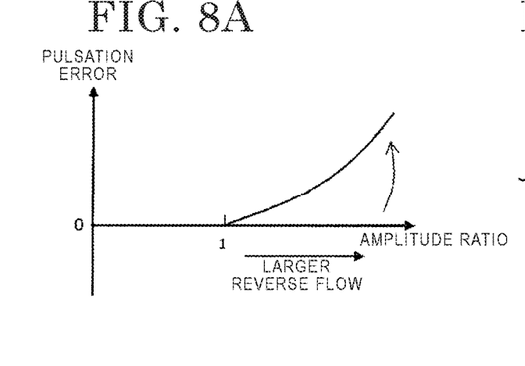
FIGS. 8A and 8B are an explanation diagram showing a pulsation error in the comparison example shown in FIG. 7.
Figure 8B:
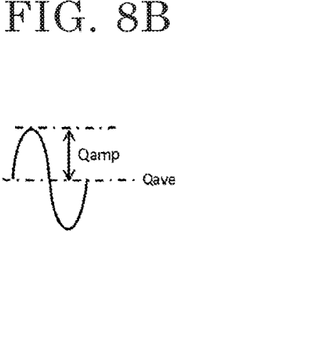

In the case of this comparison example, as shown in FIGS. 8A and 8B, where the horizontal axis represents amplitude ratio and the vertical axis represents pulsation error, in a reverse flow occurrence region where the amplitude ratio is larger than 1, the pulsation error accordingly increases toward the positive side as the amplitude ratio becomes larger than 1.

Here, the amplitude ratio is the ratio of the amplitude Qamp of the pulsation flow relative to the average flow rate Qave of the pulsation flow (=Qamp/Qave). The pulsation error is the ratio of the detected average flow rate relative to the true average flow rate (=detected average flow rate/true average flow rate−1).

Thus, in the present embodiment, as described below, in order to reduce the amount of the shift on the positive side of the detected average flow rate when a pulsation flow accompanied with a reverse flow has occurred, decrease correction which decreases the flow rate signal Vout is performed.

That is, the response correction unit 7 outputs an amplitude-increased signal which is obtained by subjecting the output signal Vm of the sensor 25 to an amplitude-increasing process of an alternating current component thereof.

The comparison signal output unit 8 compares the amplitude-increased signal with a comparison threshold TH set in advance, and outputs a comparison signal Vfc on the negative side that corresponds to a negative side portion, of the amplitude-increased signal, which is on the negative side with respect to the comparison threshold TH.

The averaging processing unit 9 outputs an average signal Vfca obtained by averaging the comparison signal Vfc.

The coefficient multiplication processing unit 10 outputs a coefficient-multiplied signal Vfk obtained by multiplying the average signal Vfca by an adjustment coefficient Kad set in advance.

The signal correction processing unit 11 outputs, as the flow rate signal Vout, a value obtained by correcting the amplitude-increased signal so as to be decreased by use of the coefficient-multiplied signal Vfk.

Due to response delay of the sensor 25, with respect to the output signal Vm, the amplitude of the alternating current component of the pulsation flow has been decreased.

By the response correction unit 7, the amplitude of the alternating current component of the output signal Vm can be increased, whereby influence of the response delay of the sensor 25 can be reduced.

However, merely by performing the amplitude-increasing process of the alternating current component, the shift on the positive side of the detected average flow rate cannot be eliminated.

Thus, by outputting the comparison signal Vfc on the negative side that corresponds to a negative side portion, of the amplitude-increased signal, which is on the negative side with respect to the comparison threshold TH, a component that corresponds to the reverse flow rate can be extracted.

By outputting the average signal Vfca obtained by averaging the comparison signal Vfc, a signal that corresponds to the average value of the reverse flow rate can be outputted.

By outputting the coefficient-multiplied signal Vfk obtained by multiplying the average signal Vfca by the adjustment coefficient Kad, a signal corresponding to the amount of the shift on the positive side of the detected average flow rate and having occurred due to the reverse flow rate can be outputted.

Then, by outputting, as the flow rate signal Vout, a value obtained by correcting the amplitude-increased signal so as to be decreased by use of the coefficient-multiplied signal Vfk, the amount of the shift on the positive side of the detected average flow rate and having occurred due to the reverse flow rate can be reduced.

In the present embodiment, as shown in FIG. 4, the response correction unit 7 outputs a first amplitude-increased signal Vf1 obtained by subjecting the output signal Vm of the sensor 25 to a first amplitude-increasing process of an alternating current component thereof, and outputs a second amplitude-increased signal Vf2 obtained by subjecting the output signal Vm of the sensor 25 to a second amplitude-increasing process of the alternating current component.

Then, the comparison signal output unit 8 compares the second amplitude-increased signal Vf2 with the comparison threshold TH, and outputs the comparison signal Vfc on the negative side.

The signal correction processing unit 11 outputs, as the flow rate signal Vout, a value obtained by correcting the first amplitude-increased signal Vf1 so as to be decreased by use of the coefficient-multiplied signal Vfk.

According to this configuration, two amplitude-increasing processes are performed. Thus, it is possible to perform the first amplitude-increasing process that is suitable for outputting the first amplitude-increased signal Vf1 which serves as the base signal for the flow rate signal Vout, and to perform the second amplitude-increasing process that is suitable for the process of reducing the amount of the shift.

That is, it is possible to perform amplitude-increasing processes that are suitable for the respective objectives of the response correction and the shift correction, and it is possible to improve the processing accuracy of the flow rate signal Vout.

FIGS. 9A to 9I show operation waveforms according to the present embodiment.

Figure 9A:
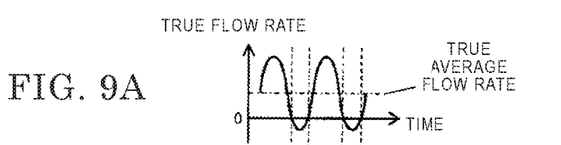
FIGS. 9A to 9I show operation waveforms according to the first embodiment of the present invention.
Figure 9B:
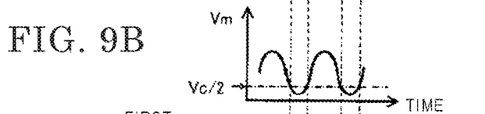

In a case where a pulsation flow accompanied with a reverse flow as shown in FIG. 9A has occurred, the output signal Vm of the sensor 25 having been subjected to A/D conversion becomes as shown in FIG. 9B.

In the output signal Vm of the sensor 25, the amplitude of the alternating current component has decreased due to response delay.

Figure 9C:
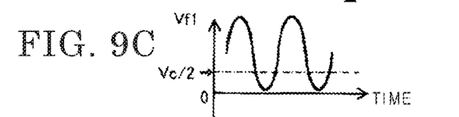

With respect to the first amplitude-increased signal Vf1 shown in FIG. 9C, the amplitude of the alternating current component has been increased than in the output signal Vm, as a result of the first amplitude-increasing process performed by the response correction unit 7.

Figure 9D:
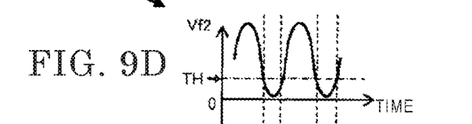

With respect to the second amplitude-increased signal Vf2 shown in FIG. 9D, the amplitude of the alternating current component has been increased than in the output signal Vm, as a result of the second amplitude-increasing process performed by the response correction unit 7.

For each amplitude-increasing process, a response advancing process or the like is used which is an inverse characteristic to the response delay characteristic of the sensor 25.

The set constants of the response advancing processes are set to different values, in accordance with respective objectives of the first amplitude-increasing process and the second amplitude-increasing process.

Figure 9E:
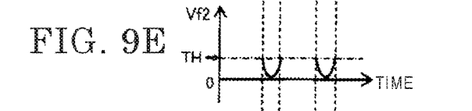
Figure 9F:
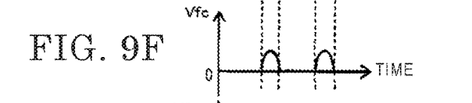

In the present embodiment, as shown in FIGS. 9D, 9E, and 9F, and Expression (4), the comparison signal output unit 8 compares the second amplitude-increased signal Vf2 with the comparison threshold TH, and extracts a negative side portion, of the second amplitude-increased signal Vf2, which is on the negative side with respect to the comparison threshold TH.

Then, when there is a negative side portion, of the second amplitude-increased signal Vf2, which is on the negative side with respect to the comparison threshold TH, the comparison signal output unit 8 outputs the absolute value of the negative side portion of the second amplitude-increased signal Vf2, as the comparison signal Vfc on the negative side.

When there is no negative side portion of the second amplitude-increased signal Vf2, the comparison signal output unit 8 outputs 0 as the comparison signal Vfc on the negative side.

In accordance with increase in the reverse flow rate, the comparison signal Vfc on the negative side increases.

1) When Vf2<TH $$Vfc=|Vf2-TH| \quad (4)$$

2) When Vf2≥TH $$Vfc=0$$

Figure 9G:
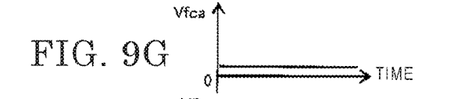

As shown in FIG. 9G, the averaging processing unit 9 outputs the average signal Vfca obtained by averaging the comparison signal Vfc.

The averaging process is performed by use of a moving-average process, a lowpass filter process, or the like.

Figure 9H:
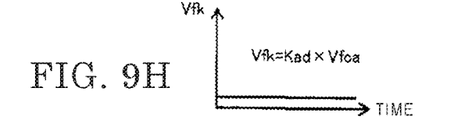
Figure 9I:
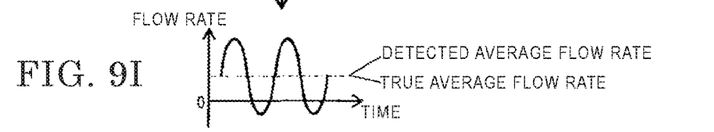

As shown in FIG. 9H and Expression (5), the coefficient multiplication processing unit 10 outputs, as the coefficient-multiplied signal Vfk, a value obtained by multiplying the average signal Vfca by the adjustment coefficient Kad.

$$Vfk=Kad \times Vfc \quad (5)$$

As shown in FIGS. 9A to 9I, the signal correction processing unit 11 outputs, as the flow rate signal Vout, a value obtained by subtracting the coefficient-multiplied signal Vfk, which has a positive value, from the first amplitude-increased signal Vf1.

The detected average flow rate calculated from the flow rate signal Vout can be made close to the true average flow rate.

Since the coefficient-multiplied signal Vfk increases in accordance with increase in the reverse flow rate, the amount of the shift on the positive side which increases in accordance with increase in the reverse flow rate can be appropriately reduced.

Figure 10:
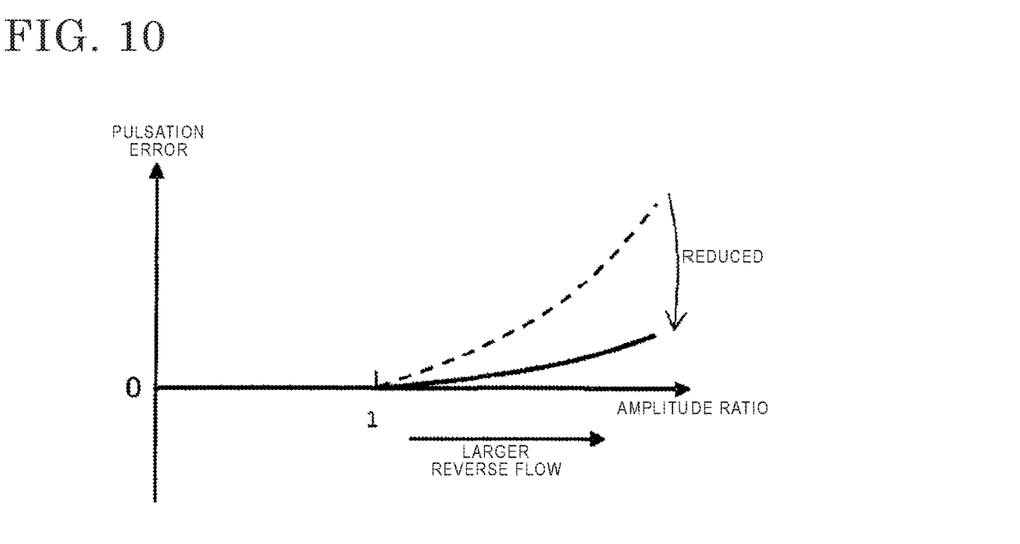
FIG. 10 is an explanation diagram showing a pulsation error in the first embodiment of the present invention.

As a result, as shown in FIG. 10, the pulsation error can be reduced in a reverse flow occurrence region where the amplitude ratio becomes larger than 1.

However, with respect to the comparison threshold TH used by the comparison signal output unit 8 described above, the comparison thresholds TH set for the individual sensors are different, respectively, because the reverse flow characteristics are different among individual sensors.

Therefore, in order to enhance the correction accuracy in the signal processing unit 3, it is important to set an optimum comparison threshold TH for each of the individual sensors.

In a comparison threshold setting method of the present embodiment, when the flow advancing from upstream toward downstream is defined as a forward flow and the flow advancing from downstream toward upstream is defined as a reverse flow, the flow rate characteristic on the reverse flow side of the sensor is measured, and a flow rate signal that corresponds to a target flow rate is set as the comparison threshold TH.

Figure 11:
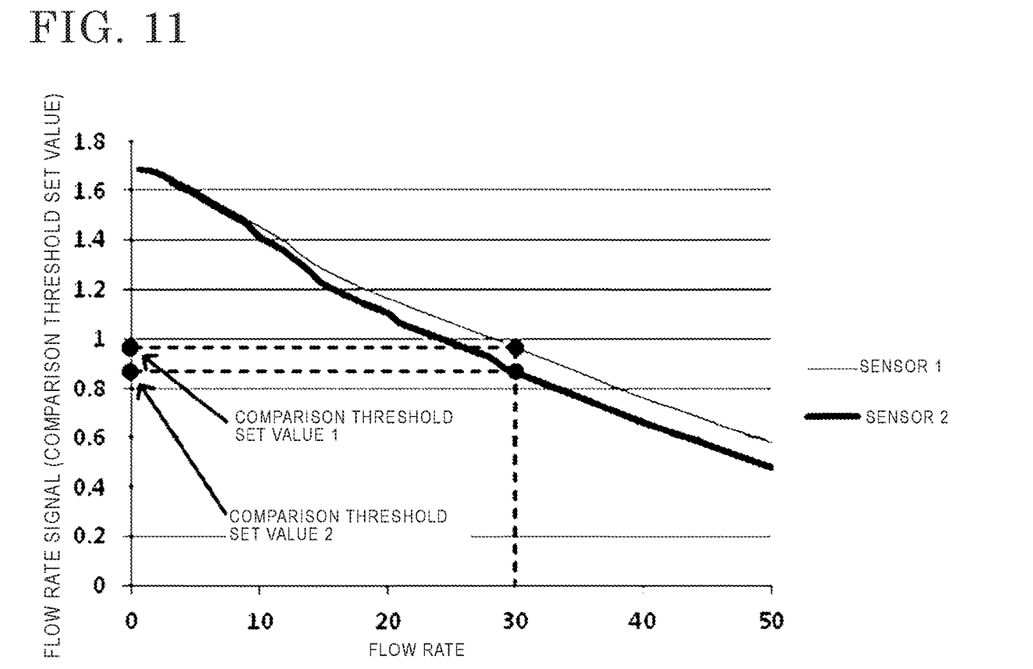
FIG. 11 is a diagram describing setting of comparison thresholds for the signal processing unit in the first embodiment of the present invention.

As an example, although the reverse flow characteristic of a single sensor is different between a sensor 1 and a sensor 2 due to influence of variation in the mounting state or the like as shown in FIG. 11, if the reverse flow characteristic is measured for each sensor, a target comparison threshold can be accurately obtained.

As described above, according to the present embodiment, in a thermal air flow meter including:

a bypass flow path which is disposed in an intake pipe in which intake air to be taken into an internal combustion engine flows and which takes in part of the intake air and causes the part of the intake air to flow therethrough;

a sensor which has a flow rate detection element disposed in the bypass flow path and which outputs an output signal that corresponds to a flow rate of the intake air flowing in a forward flow direction and a reverse flow direction in the intake pipe; and a signal processing unit which processes the output signal of the sensor, the signal processing unit includes:

a response correction unit which outputs a first amplitude-increased signal and a second amplitude-increased signal which are each obtained by subjecting the output signal of the sensor to an amplitude-increasing process of an alternating current component thereof;

a comparison signal output unit which compares the second amplitude-increased signal with a comparison threshold set in advance, and which outputs a comparison signal on a negative side that corresponds to a negative side portion, of the second amplitude-increased signal, which is on the negative side with respect to the comparison threshold;

an averaging processing unit which outputs an average signal obtained by averaging the comparison signal;

a coefficient multiplication processing unit which outputs a coefficient-multiplied signal obtained by multiplying the average signal by an adjustment coefficient set in advance; and a signal correction processing unit which outputs, as a flow rate signal, a value obtained by correcting the first amplitude-increased signal so as to be decreased by use of the coefficient-multiplied signal, and the comparison threshold is set on the basis of a flow rate characteristic of the reverse flow side of the sensor measured in advance.

Second Embodiment

In the first embodiment, the comparison threshold TH is calculated on the basis of the flow rate characteristic on the reverse flow side of a sensor having been measured. However, as a second embodiment, an example is described in which a comparison threshold is calculated by use of values of an adjustment value and the forward flow characteristic having been measured.

When a sensor is assembled, in adjustment of the forward flow characteristic to attain a desired characteristic, a raw output Dm of the sensor is corrected by use of a gain G and an offset Doff as shown in Expression (6) below.

Here, Dm is a value obtained by subjecting a raw output Vm of the sensor to A/D conversion.

$$Dout=G(Dm-Doff) \quad (6)$$

The parameters that can be confirmed by an actual flow rate characteristic test machine are an output Dout after correction, the gain G, and the offset Doff. Thus, Dm is obtained by Expression (6) for calculation of a comparison threshold TH. If the obtained Dm is put into Expression (7) below, the comparison threshold TH can be calculated.

$$TH=Dm(1)-K^*(Dm(2)-Dm(1))/(Qm(2)-Qm(1)) \quad (7)$$

Here, TH is the flow rate signal of the sensor that corresponds to a comparison threshold, $K^*$ is a coefficient, Dm(1) and Dm(2) are the flow rate signal at two points on the forward flow side of the sensor, and Qm(1) and Qm(2) are flow rate values that correspond to Dm(1) and Dm(2), respectively.

Figure 12:
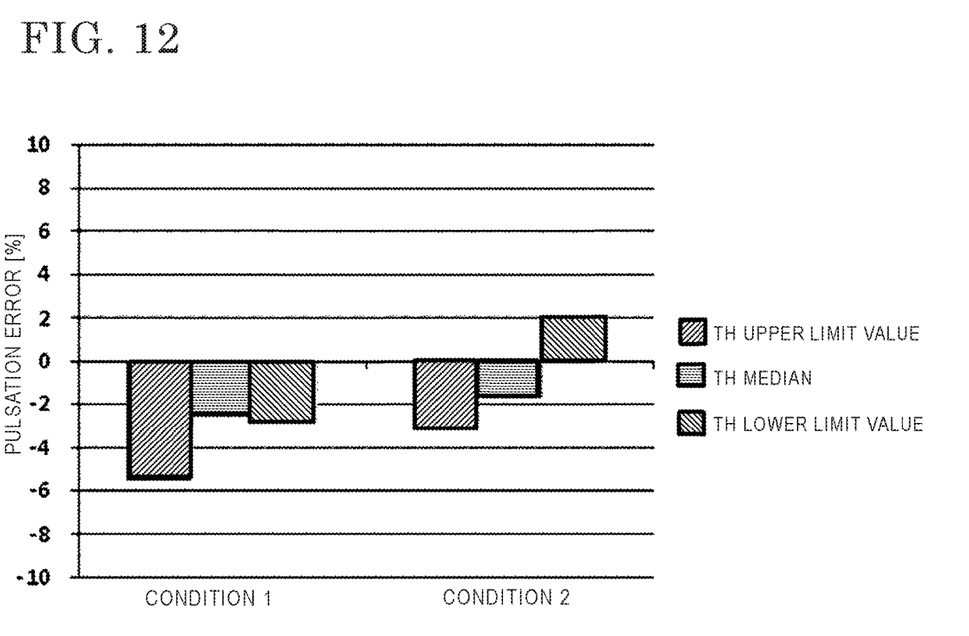
FIG. 12 shows pulsation error when the comparison thresholds are set at the upper limit value, the median, and the lower limit value of variation in a second embodiment of the present invention.

The variation of the comparison threshold TH of each sensor when Expression (7) is used is obtained. FIG. 12 shows pulsation error under the conditions of pulsations 1, 2 accompanied with reverse flows, when the comparison thresholdTH is set at the upper limit value, the median, and the lower limit value of the variation.

In all cases where the comparison threshold TH is the upper limit value, the median, and the lower limit value, the pulsation error is at levels that are harmless in actual use environments.

In addition, the second embodiment does not require measurement of the reverse flow, and thus, is advantageous in that no reverse flow measuring device is required, and that man-hour during assembling can be reduced.

It is needless to say that, as the flow rate signal of the sensor used in calculation of the comparison threshold TH, the value before the A/D conversion can be used.

Third Embodiment

Even when a flow rate signal Dm(0) at a time of no air flow of the sensor is used as Dm(2) in Expression (7) described in the second embodiment, the comparison threshold TH can be accurately obtained.

$$TH = Dm(0) - K^*(Dm(1) - Dm(0))/Qm(1) \quad (8)$$

Here, TH is the flow rate signal of the sensor that corresponds to a comparison threshold, $K^*$ is a coefficient, Dm(1) is the flow rate signal on the forward flow side of the sensor, Dm(0) is the flow rate signal of the sensor at a time of no air flow, and Qm(1) is a flow rate value that corresponds to Dm(1).

Also when the comparison threshold TH is calculated according to the third embodiment, the variation of the comparison threshold TH is at a level similar to that described in the second embodiment, and the influence on the pulsation error is at a harmless level.

Furthermore, the number of the points where a flow rate characteristic test machine measures the flow rate can be reduced by one compared with that in the second embodiment. Thus, man-hour during assembling can be reduced.

It is noted that, within the scope of the present invention, the above embodiments may be freely combined with each other, or each of the above embodiments may be modified or abbreviated as appropriate.

Various modifications and alterations of this invention will be apparent to those skilled in the art without departing from the scope and spirit of this invention, and it should be understood that this is not limited to the illustrative embodiments set forth herein.

What is claimed is:

1. A thermal air flow meter comprising:
   a bypass flow path which is disposed in an intake pipe in which intake air to be taken into an internal combustion engine flows, and which takes in part of the intake air and causes the part of the intake air to flow therethrough;
   a sensor which has a flow rate detection element disposed in the bypass flow path and which outputs an output signal that corresponds to a flow rate of the intake air flowing in a forward flow direction and a reverse flow direction in the intake pipe; and
   a signal processing unit which processes the output signal of the sensor, wherein
   the signal processing unit includes following processing:
      outputting a first amplitude-increased signal and a second amplitude-increased signal which are each obtained by subjecting the output signal of the sensor to an amplitude-increasing process of an alternating current component thereof;
      comparing the second amplitude-increased signal with a comparison threshold set in advance, and which outputs a comparison signal on a negative side that corresponds to a negative side portion, of the second amplitude-increased signal, which is on the negative side with respect to the comparison threshold;
      outputting an average signal obtained by averaging the comparison signal;
      outputting a coefficient-multiplied signal obtained by multiplying the average signal by an adjustment coefficient set in advance; and
      outputting, as a flow rate signal, a value obtained by correcting the first amplitude-increased signal so as to be decreased by use of the coefficient-multiplied signal, and
   the comparison threshold is set on the basis of an output characteristic of the sensor measured in advance.

2. The thermal air flow meter according to claim 1, wherein
   the comparison threshold is set on the basis of a flow rate characteristic on the reverse flow side as the output characteristic of the sensor.

3. The thermal air flow meter according to claim 1, wherein
   the comparison threshold is set by an approximate expression obtained through calculation of the flow rate signal at at least two flow rate points on the forward flow side in the output characteristic of the sensor.

4. The thermal air flow meter according to claim 1, wherein
   the comparison threshold is set by an approximate expression calculated from an output at a time of no air flow and an output at one flow rate point in a forward flow side in the output characteristic of the sensor.

5. The thermal air flow meter according to claim 1, wherein
   the sensor includes, as the flow rate detection element, an upstream heating resistor disposed to an upstream side of the intake air, and a downstream heating resistor disposed to a downstream side of the intake air with respect to the upstream heating resistor.

* * * * *